(12) United States Patent
Hirose et al.

(10) Patent No.: US 8,544,313 B2
(45) Date of Patent: Oct. 1, 2013

(54) ROTARY ANGLE AND ROTARY TORQUE SENSING DEVICE

(75) Inventors: Shinji Hirose, Osaka (JP); Kiyotaka Sasanouchi, Osaka (JP)

(73) Assignee: Panasonic Corporation, Osaka (JP)

( * ) Notice: Subject to any disclaimer, the term of this patent is extended or adjusted under 35 U.S.C. 154(b) by 325 days.

(21) Appl. No.: 13/041,870

(22) Filed: Mar. 7, 2011

(65) Prior Publication Data

US 2011/0219851 A1  Sep. 15, 2011

(30) Foreign Application Priority Data

Mar. 15, 2010 (JP) ................................. 2010-057066

(51) Int. Cl.
*G01L 3/10* (2006.01)
(52) U.S. Cl.
USPC ........................................ 73/1.09; 73/862.08
(58) Field of Classification Search
USPC ............................................ 73/862.08, 1.09
See application file for complete search history.

(56) References Cited

U.S. PATENT DOCUMENTS 6,880,254 B2 * 4/2005 Uehira et al. ................. 33/1 PT
2009/0058405 A1 * 3/2009 Oike et al. ............... 324/207.25

FOREIGN PATENT DOCUMENTS

JP  2008-082826  4/2008

* cited by examiner

*Primary Examiner* — Hezron E Williams
*Assistant Examiner* — Paul West
(74) *Attorney, Agent, or Firm* — Panasonic Patent Center

(57) ABSTRACT

A rotary-angle and rotary-torque sensing device includes a first rotator rotating together with a steering shaft, a second rotator rigidly mounted to the first rotator, a rotary torque sensor for sensing rotary torque generated between the first rotator and the second rotator, a first sensor rotating together with the first rotator, a second sensor rotating together with the second rotator, a rotary angle sensor for sensing rotary angles of the first sensor and the second sensor, and a controller for detecting rotary torque by using the rotary torque sensor and the rotary angle sensor.

8 Claims, 5 Drawing Sheets

ROTARY ANGLE AND ROTARY TORQUE SENSING DEVICE

FIELD OF THE INVENTION

The present invention relates to a rotary-angle and rotary-torque sensing device to be used for sensing a rotary angle and rotary torque of a steering shaft of an automobile.

BACKGROUND OF THE INVENTION

In recent years the automobile has been sophisticated, which entails incremental use of a variety of rotary torque sensors or rotary angle sensors for sensing rotary torque or a rotary angle of a steering shaft in order to control a power steering device or a braking device.

One of the foregoing conventional rotary angle and rotary torque sensing devices is described hereinafter with reference to FIG. 5 which is a sectional view of this conventional device.

In FIG. 5, conventional device 20 is formed of the following structural elements: first rotator 1, holder 2, magnet 3, second rotator 4, first ferromagnetic body 5, second ferromagnetic body 6, spacer 7, printed circuit board 8, magnetic sensing element 9, controller 11, coupler 12, third rotator 13, first sensor 14, second sensor 15, magnets 16A, 17A, and magnetic sensing elements 16B, 17B.

First rotator 1 is shaped like a cylinder and rotates together with the steering shaft. Holder 2 is shaped like a cylinder. Magnet 3 is shaped like a cylinder where multiple N-poles and S-poles are alternately and adjoiningly arrayed. Magnet 3 adheres to a lower section of an outer wall of holder 2, which adheres to an upper section of an inner wall of first rotator 1.

Second rotator 4 shapes like a cylinder. First and second ferromagnetic bodies 5 and 6 are shaped like a ring respectively, and spacer 7 is also shaped like a ring. Second rotator 4 is placed below first rotator 1. First ferromagnetic body 5 is placed above second ferromagnetic body 6, and these two ferromagnetic bodies adhere to an upper section of second rotator 4 such that they confront an outer wall of magnet 3 with a given space therebetween via spacer 7.

Printed circuit board 8 has multiple wiring patterns (not shown) on both the faces, and placed beside, substantially in parallel with, first rotator 1 and second rotator 4. Magnetic sensing element 9 includes a Hall element and is disposed between first ferromagnetic body 5 and second ferromagnetic body 6 on a face confronting magnet 3.

Rotary torque sensing section 10 is formed of first and second ferromagnetic bodies 5 and 6, magnet 3 confronting ferromagnetic bodies 5 and 6, and magnetic sensing element 9. Controller 11, which includes electronic components such as a microprocessor, is formed on printed circuit board 8. Controller 11 is coupled to magnetic sensing element 9.

Between first rotator 1 and second rotator 4, coupler 12 is provided such that an upper section of coupler 12 adheres to rotator 1 and a lower section thereof adheres to rotator 4. Coupler 12, e.g. torsion bar, is made of steel and shaped like a pole.

Third rotator 13 includes a spur gear at its underside. First and second sensors 14, 15 include spur gears on their outer walls. Third rotator 13 is rigidly mounted to a lower end of second rotator 4, and first sensor 14 mates with spur gear of third rotator 13 and second sensor 15 mates with spur gear of first sensor 14.

Magnets 16A and 17A are mounted at the center of first sensor 14 and at the center of second sensor 15 respectively by insert-molding. Printed circuit board 8 is placed beside and generally in parallel with those magnets 16A and 17A. Printed circuit board 8 includes magnetic sensing elements 16B and 17B such as AMR (anisotropic magnetic resistance) at places confronting magnets 16A and 17A respectively.

Magnet 16A and magnetic sensing element 16B form rotary angle sensor 16, and magnet 17A and magnetic sensing element 17B form rotary angle sensor 17. Magnetic sensing elements 16B and 17B are connected to controller 11. Rotary angle and rotary torque sensing device 20 is thus formed.

Sensing device 20 discussed above has first rotator 1 coupled to the steering shaft and is mounted below the steering wheel of the automobile. Controller 11 is coupled to an electronic circuit of the automobile via connectors and leadwires (not shown).

With the foregoing structure, turning of the steering wheel entails rotation of first rotator 1, and also entails rotation of second rotator 4 which is connected to first rotator via coupler 12. Therefore, third rotator 13 adhering to the lower end of second rotator 4 rotates. This mechanism allows first sensor 14 mated with third rotator 13 and second sensor 15 mated with first sensor 14 to rotate together with third rotator 13.

The rotation of first and second sensors 14 and 15 entails the rotation of magnets 16A and 17A, which are mounted at the centers of sensors 14 and 15 respectively. Since magnetisms emitted from magnets 16A and 17A vary due to the rotation, magnetic sensing elements 16B and 17B sense the varying magnetisms, and then a rotary angle sensing signal is supplied to controller 11, where the rotary angle sensing signal repeats fluctuations and draws like a sine-wave, cosine-wave or saw-tooth wave.

Controller 11 carries out a given calculation based on the rotary angle sensing signal, supplied from rotary angle sensors 16 and 17, as well as the number of teeth of respective gears. Controller 11 thus senses the rotary angle of third rotator 13, i.e. the rotary angle of the steering shaft, and the result is supplied to the electronic circuit of the automobile.

The rotations of the steering shaft and first rotator 1 entail coupler 12 to twist, and then second rotator 4 starts rotating slightly behind first rotator 1. For instance, smaller rotary torque is required for turning the steering wheel when the automobile is driven, so that the delay of second rotator 4 relative to first rotator 1 is small. To the contrary, greater rotary torque is needed when the automobile is halted, so that second rotator 4 starts rotating with a greater delay relative to first rotator 1.

The rotations of first and second rotators 1 and 4 entail magnet 3 adhering to those rotators to rotate, and also prompt first and second ferromagnetic bodies 5 and 6 to start rotating after slight delays from magnet 3. Magnetic sensing element 9 senses variation in the magnetism of magnet 3, formed of multiple N-poles and S-poles placed alternately and adjoiningly to each other, via first and second ferromagnetic bodies 5 and 6, and supplies the sensed variation in the magnetism to controller 11.

At this time, magnetic sensing element 9 senses weak magnetism when second rotator 4, to which first and second ferromagnetic bodies 5 and 6 adhere, starts rotating after a small delay from first rotator 1, whereas sensing element 9 senses strong magnetism when second rotator 4 starts rotating after a great delay from first rotator 1.

Based on magnitude of the magnetism sensed via ferromagnetic bodies 5 and 6 by sensing element 9, controller 11 calculates the rotary torque of first rotator 1, i.e. the rotary torque of the steering shaft. The calculated rotary torque is supplied to the electronic circuit of the automobile. Using this calculated rotary torque and other data, the electronic circuit controls the power steering device, the braking device, and other devices of the automobile, where the other data includes the rotary angle of the rotary shaft discussed previously and supplied from controller 11, and various other data supplied from other sensors including a velocity sensor mounted somewhere in the automobile.

As discussed above, in response to the rotary angle or the rotary torque supplied from controller 11, conventional rotary angle and rotary torque sensing device 20 controls not only the effectiveness of the braking device in accordance with an angle of the steering wheel turned by a driver but also the operating force for turning the steering wheel.

Patent Literature of Unexamined Japanese Patent Application Publication No. 2008-82826 is known to the public as one of related art to the present invention.

Conventional sensing device 20 discussed previously includes magnet 3, first and second ferromagnetic bodies 5 and 6, which work for sensing the rotary torque, and those elements are covered with first rotator 1 and second rotator 2. However, when foreign matters such as iron powders attach to those structural elements 3, 5, or 6, magnetic sensing element 9 senses an error in the magnetism emitted from magnet 3 via first and second ferromagnetic bodies 5 and 6. As a result, sensing device 20 fails to sense accurate rotary torque.

SUMMARY OF THE INVENTION

The present invention addresses the problem discussed above, and aims to provide a rotary-angle and rotary-torque sensing device capable of sensing rotary torque accurately and positively with a smaller error.

The rotary-angle and rotary-torque sensing device of the present invention comprises the following structural elements:

a first rotator rotating together with a steering shaft;

a second rotator rigidly mounted to the first rotator via a coupler;

a rotary torque sensor for sensing rotary torque generated between the first rotator and the second rotator;

a first sensor rotating together with the first rotator;

a second sensor rotating together with the second rotator;

a rotary angle sensor for sensing rotary angles of the first and second sensors; and a controller coupled to both of the rotary torque sensor and the rotary angle sensor for sensing rotary torque of the steering shaft by using the rotary torque sensor and the rotary angle sensor.

PREFERRED EMBODIMENT OF THE INVENTION

An exemplary embodiment of the invention is demonstrated hereinafter with reference to the accompanying drawings.

Exemplary Embodiment

Figure 1:
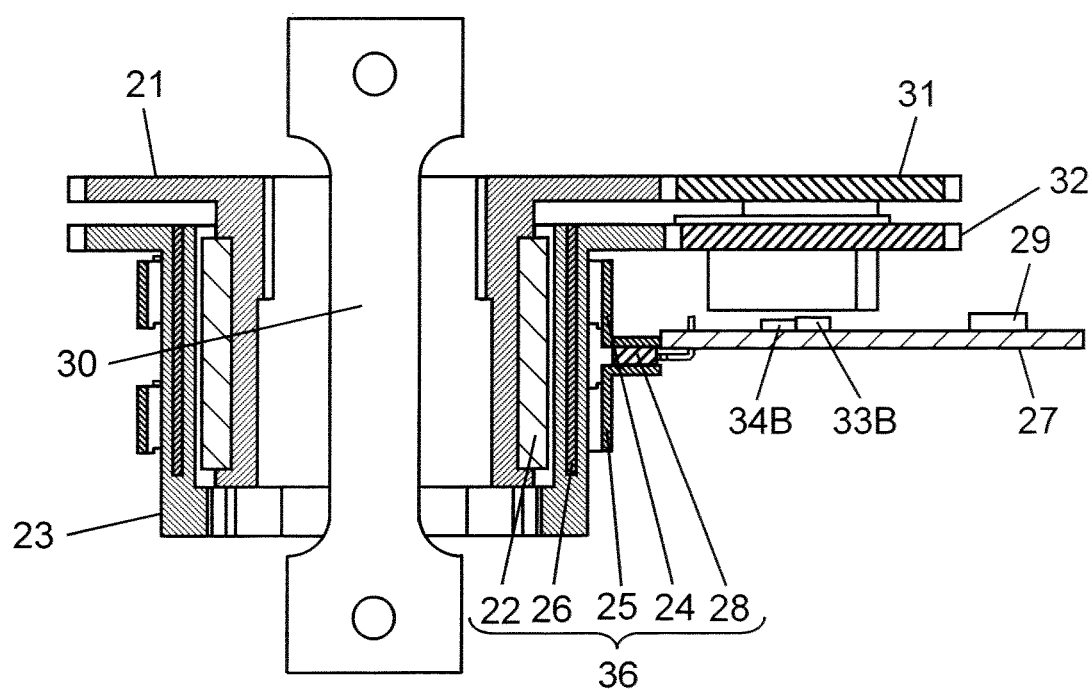
FIG. 1 is a sectional view of a rotary angle and rotary torque sensing device in accordance with an embodiment of the present invention.
Figure 2:
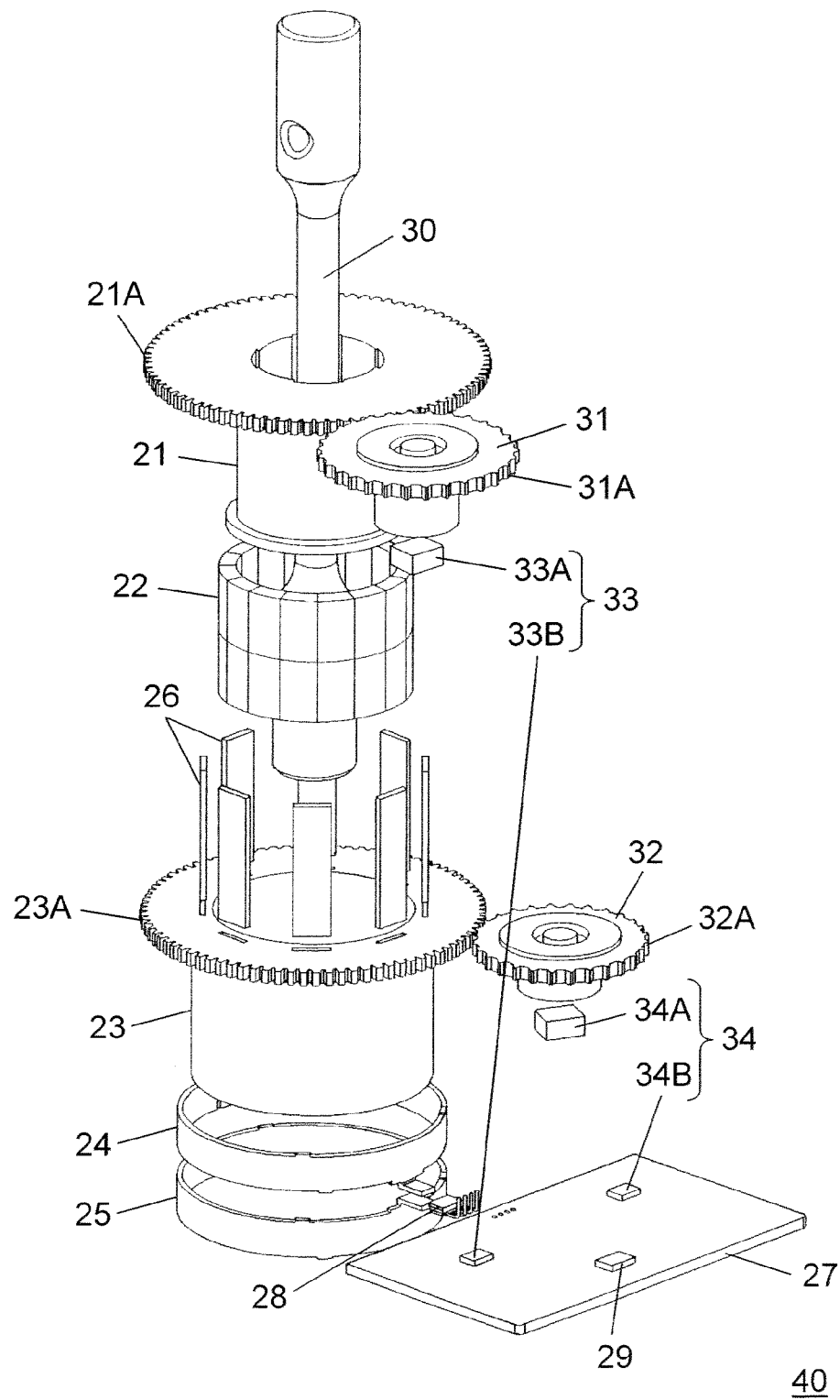
FIG. 2 is an exploded perspective view of the rotary angle and rotary torque sensing device in accordance with an embodiment of the present invention.

FIG. 1 is a sectional view of a rotary angle and rotary torque sensing device in accordance with this embodiment of the present invention. FIG. 2 is an exploded perspective view of the rotary angle and rotary torque sensing device. Rotary angle and rotary torque sensing device 40 in accordance with this embodiment includes the following structural elements: first rotator 21, magnet 22 (first magnet), second rotator 23, first ferromagnetic body 24, second ferromagnetic body 25, third ferromagnetic body 26, printed circuit board 27, magnetic sensing element 28 (first magnetic sensing element), coupler 30, first sensor 31, second sensor 32, magnet 33A (second magnet), magnet 34A (third magnet), magnetic sensing element 33B (second magnetic sensing element), magnetic sensing element 34B (third magnetic sensing element), and controller 29.

First rotator 21 is shaped like a cylinder and is made of insulating resin such as polybutylene terephthalate, and rotates together with a steering shaft. First rotator 21 includes spur gear 21A formed on the outer wall and at the upper end of rotator 21.

Figure 3A:
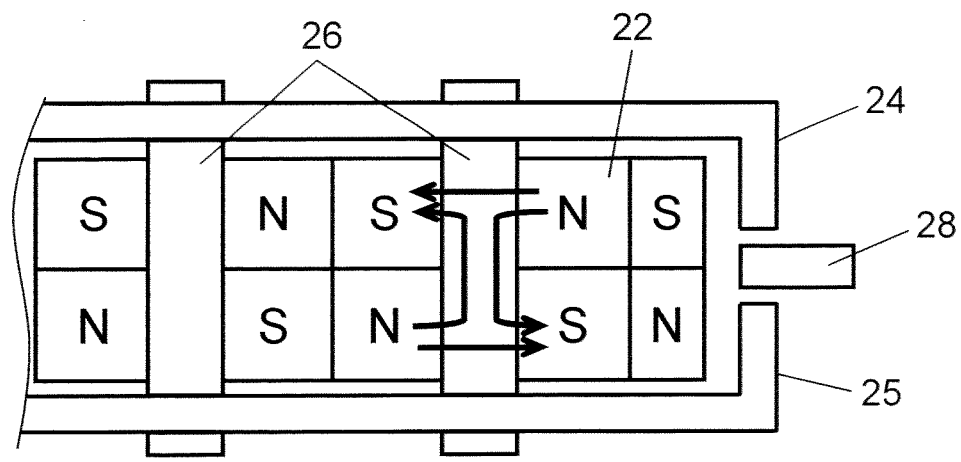
FIG. 3A is a lateral view of a magnet in part and its vicinity of the rotary angle and rotary torque sensing device in accordance with an embodiment of the present invention.
Figure 3B:
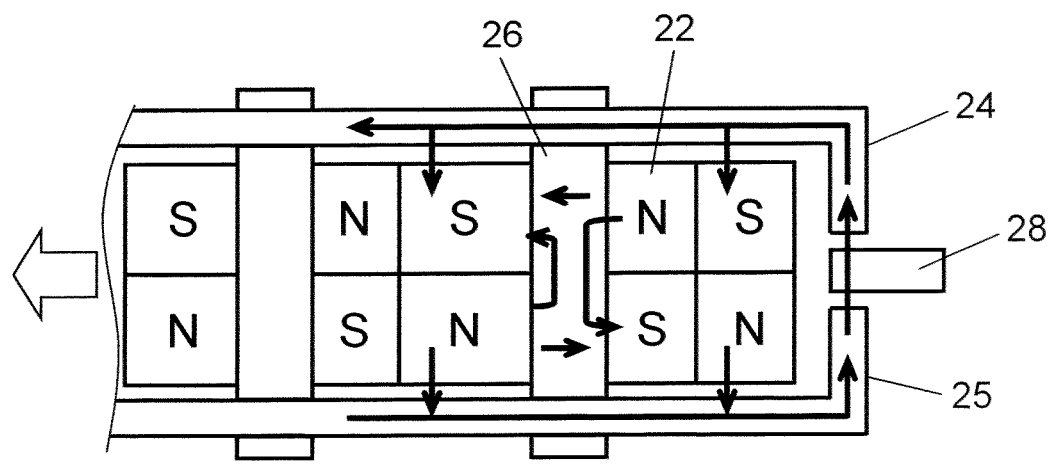
FIG. 3B is another lateral view of the magnet in part and its vicinity of the rotary angle and rotary torque sensing device in accordance with an embodiment of the present invention.

Magnet 22 is shaped like a cylinder and contains ferrite or Nd—Fe—B alloy. FIGS. 3A and 3B are lateral views of magnet 22 in part and its vicinity employed in sensing device 40. As shown in FIGS. 2, 3A, and 3B, magnet 22 is formed of a given number of N-poles and S-poles arrayed and magnetized such that different poles are placed at intervals of a given angle, e.g. in the case of employing 16 magnets the interval is 22.5 degrees, and adjoiningly to each other both in vertical and lateral directions. Two rows of magnetic poles are arrayed vertically to form cylindrical magnet 22, which is rigidly mounted on the outer wall of first rotator 21 and at the lower end of rotator 21 by an insert-molding method or with adhesive.

Second rotator 23 is shaped like a cylinder and is made of insulating resin such as polybutylene terephthalate. Rotator 23 has spur gear 23A formed at the upper end and on the outer wall of rotator 23. Second rotator 23 is laid below first rotator 21.

First and second ferromagnetic bodies 24 and 25 contain permalloy, Fe, or Ni—Fe alloy, and are formed of belt-like plate wound into rings. Ferromagnetic bodies 24 and 25 are placed on the outer wall of second rotator 23 such that their inner walls confront magnet 22. As shown in FIG. 2 and FIGS. 3A, 3B, second ferromagnetic body 25 is placed on the outer wall of second rotator 23 such that a space is formed between ferromagnetic body 24 and ferromagnetic body 25.

Third ferromagnetic body 26 is shaped like a flap and contains permalloy, Fe, or Ni—Fe alloy. Multiple third ferromagnetic bodies 26 are arranged at intervals of a given angle, e.g. in the case of employing eight ferromagnetic bodies 26 they are arranged at intervals of 45 degrees. They are placed between the outer wall of magnet 22 and the inner walls of ferromagnetic bodies 24 and 25. Third ferromagnetic bodies 26 are rigidly mounted radially to second rotator 23 by the insert-molding method.

Printed circuit board 27 has base material which is made of paper phenol or glass epoxy, and multiple wiring patterns (not shown) formed of copper foil are laid on one of the faces or both of the faces of board 27, which is placed horizontally beside first and second rotators 21 and 23.

Magnetic sensing element 28 includes a Hall element for sensing vertical magnetism and a GMR (giant magnetism resistance effect) element for sensing horizontal magnetism. Element 28 is mounted on printed circuit board 27 and placed in a gap formed between first ferromagnetic body 24 and second ferromagnetic body 25 such that element 28 confronts magnet 22.

First, second, third ferromagnetic bodies 24, 25, 26 and magnet 22 as well as magnetic sensing element 28 which confronts magnet 22 form rotary torque sensor 36. On printed circuit board 27, controller 29 formed of electronic components such as a microprocessor is placed, and controller 29 is coupled to magnetic sensing element 28.

Between first rotator 21 and second rotator 23, coupler 30, e.g. torsion bar, made of steel and shaped like a pole is placed such that the upper section of coupler 30 is rigidly connected to first rotator 21 and the lower section is rigidly connected to second rotator 23.

First sensor 31 and second sensor 32 are made of insulating resin or metal. Spur gear 31A (first spur gear) is formed on the outer wall of first sensor 31, and spur gear 32A (second spur gear) is formed on the outer wall of second sensor 32. Spur gear 21A coupled to first rotator 21 mates with spur gear 31A coupled to first sensor 31, and spur gear 23A coupled to second rotator 23 mates with spur gear 32A of second sensor 32.

Spur gear 21A of first rotator 21 and spur gear 23A of second rotator 23 have the greatest diameter and the greatest number of teeth among other gears, and spur gear 31A of first sensor 31 has a greater diameter and a greater number of teeth than those of spur gear 32A of second sensor 32. For instance, the number of teeth of spur gears 21A and 23A is 84, and that of spur gear 31A is 30, and that of spur gear 32A is 28.

Magnet 33A is insert-molded at the center of first sensor 31, and magnet 34A is insert-molded at the center of second sensor 32. Magnetic sensing elements 33B and 34B, such as AMR (anisotropic magnetic resistance) elements, are mounted on printed circuit board 27 placed generally below and in parallel with magnets 33A, 34A. Sensing elements 33B and 34B confront magnets 33A and 34A respectively.

Magnet 33A and magnetic sensing element 33B form rotary angle sensor 33, and magnet 34A and magnetic sensing element 34B form rotary angle sensor 34. Magnetic sensing elements 33B and 34B are coupled to controller 29.

Rotary angle and rotary torque sensing device 40 discussed above is mounted below the steering wheel of an automobile with first rotator 21 mounted on the steering shaft. Controller 29 is coupled to the electronic circuit (not shown) of the automobile via connectors and lead-wires (not shown).

Turning the steering wheel in the foregoing structure entails first rotator 21 to rotate and coupler 30 to twist, and then second rotator 23 starts rotating after a small delay from first rotator 21. At this time, the delay of second rotator 23 relative to first rotator 21 is small because small rotary torque is needed when the automobile runs. To the contrary, the delay is greater because great rotary torque is needed when the automobile stops.

The rotations of first rotator 21 and second rotator 23 entail first sensor 31 mating with first rotator 21 to rotate, and also entail second sensor 32 mating with second rotator 23 to rotate. The rotations of first and second sensors 31 and 32 entail the rotations of magnets 33A and 34A insert-molded at the centers of sensors 31 and 32. The rotations vary the magnetism emitted from magnets 33A and 34A, and magnetic sensing elements 33B and 34B sense the variations in the magnetism of magnets 33A and 34A respectively. Sensing elements 33B and 34B then output rotary-angle sensing signals to controller 29. The signals are shaped like sine-waves, cosine-waves or saw-tooth waves and repeat fluctuations, At this time, since spur gear 31A has different number of teeth from that of spur gear 32A, the data waveforms are supplied from magnetic sensing elements 33B and 34B to controller 29 as sensing signals having phase differences from each other.

Controller 29 carries out a given calculation based on the rotary angle sensing signals supplied from first and second sensors 31, 32 as well as the number of teeth of respective gears. Based on the calculation result, controller 29 then detects the rotary angles of first rotator 21 and second rotator 23, namely, the rotary angle of the steering shaft, and supplies the detection result to the electronic circuit of the automobile.

At this time, as discussed previously, second rotator 23 starts rotating after a slight delay from first rotator 21, so that second sensor 32 mating with second rotator 23 also starts rotating after a slight delay from first sensor 31 mating with first rotator 21.

The rotary-angle sensing signal supplied from magnetic sensing element 34B to controller 29 thus shifts from the one supplied from magnetic sensing element 33B by a quantity of this rotation delay. The rotation delay is small when the automobile runs because small rotary torque is needed to turn the steering wheel, whereas the rotation delay is great when the automobile stops because great rotary torque is needed.

Use of the foregoing mechanism allows controller 29 to detect the rotary torque of the steering shaft (i.e. the rotary torque generated between first rotator 21 and second rotator 23) based on a shift quantity between the rotary angle of first sensor 31 and the rotary angle of second sensor 32. To be more specific, based on the shift quantity between the rotary-angle sensing signals supplied from second sensor 32 and first sensor 31 as well as the numbers of teeth of the gears mounted to these sensors, controller 29 detects not only the rotary angle of the steering shaft but also the rotary torque thereof. The detection accuracy in the rotary angle is approx. 0.7 degree.

The rotation of first rotator 21 followed by the rotation of second rotator 23 with a slight delay entails the rotation of magnet 22 rigidly mounted to rotator 21, and third ferromagnetic body 26 starts rotating after a slight delay from magnet 22. Magnetic sensing element 28 senses, via first and second ferromagnetic bodies 24 and 25, the variation in magnetism emitted from between N-poles and S-poles arranged adjoiningly to each other at intervals of a given angle, and then it supplies the sensing result to controller 29.

In a case where the automobile runs straight with the steering wheel staying at a neutral position, i.e. the steering wheel is not operated, centers of multiple third ferromagnetic bodies 26 are present at respective centers between N-poles and S-poles of magnet 22, as shown in FIG. 3A, where different poles are arranged adjoiningly to each other in the vertical direction and the lateral direction. To be more specific, each center of respective third ferromagnetic bodies 26 exists on the boundary between N-pole and S-pole. This structure allows the magnetic force traveling from multiple N-poles to multiple S-poles to be in a balanced state due to the presence of third ferromagnetic body 26.

No magnetic flux is thus generated between first ferromagnetic body 24 and second ferromagnetic body 25, because they are placed outside magnet 22 and third ferromagnetic body 26, so that magnetic sensing element 28 placed between ferromagnetic bodies 24 and 25 senses no magnetism.

On the other hand, in the case of turning the steering wheel to the right or the left, magnet 22 rotates and rotary torque is thus generated. In this case, as shown in FIG. 3B, magnet 22 rotates to the left, and magnet 22 generates the magnetic flux on third ferromagnetic body 26 such as a closed magnetic circuit from N-pole to S-pole. At the same time, magnet 22 generates the magnetic flux traveling from N-pole to S-pole on first ferromagnetic body 24 and second ferromagnetic body 25. Magnetic sensing element 28 senses those magnetisms, and outputs voltages to controller 29 as rotary-torque sensing signals in response to the magnitude of those magnetisms.

Magnetic sensing element 28 senses weak magnetism when second rotator 23 starts rotating after a small delay relative to first rotator 21 to which magnet 22 is rigidly mounted, whereas element 28 senses strong magnetism when the delay is great.

Controller 29 can thus detect the rotary torque of first rotator 21, i.e. the rotary torque of the steering shaft, based on the magnitude of the magnetism sensed by magnetic sensing element 28, via first, second, and third ferromagnetic bodies 24, 25, and 26. This detection accuracy is approx. 0.1 degree. The rotary torque detected by controller 29 is supplied to the electronic circuit of the automobile. The electronic circuit carries out calculations using various data including this rotary torque, the rotary angle previously discussed, information transmitted from velocity sensors mounted somewhere in the automobile, and other data, thereby controlling the power steering device, the braking device and others.

The electronic circuit thus gains control of driving the automobile in response to a running state or a stopped state of the automobile based on the rotary torque data supplied from controller 29. For instance, during the running of the automobile, the steering shaft needs small torque, so that the electronic circuit loosens the effectiveness of the power steering device for a driver to turn the steering wheel with somewhat greater force. To the contrary, during the stop of the automobile, the steering shaft needs great torque, so that the electronic circuit gives the power steering device greater effectiveness for allowing the driver to turn the steering wheel with smaller force.

The electronic circuit also gains control of the braking device in response to the turning of the steering wheel based on the rotary angle supplied from controller 29. For instance, the electronic circuit makes the effectiveness of the braking device intermittently when the steering wheel is turned in a great angle, whereas it makes the effectiveness of the braking device constantly when the steering wheel is turned in a small angle.

At this time, controller 29 receives not only based on the rotary torque sensing signal supplied from magnetic sensing element 28 but also, as discussed previously, based on the rotary angle sensing signal supplied from magnetic sensing elements 33B and 34B. Using these two types of signals, controller 29 can detect the rotary torque of the steering shaft.

In other words, controller 29 can detect the rotary torque not only based on an accurate rotary-torque sensing signal supplied from the rotary torque sensor formed of magnet 22 and magnetic sensing element 28, but also based on the rotary-angle sensing signal, having somewhat lower accuracy, supplied from the rotary angle sensor formed of magnets 33A, 34A and magnetic sensing elements 33B, 34B.

Assume that magnetic sensing element 28 will output a rotary torque sensing signal having some error because foreign matter such as iron powder attaches to magnet 22, first ferromagnetic body 24 or second ferromagnetic body 25 forming the rotary torque sensor. In such a case, the structure discussed previously allows comparing this signal having some error with the rotary torque calculated from the rotary-angle sensing signal supplied from the rotary angle sensor. This comparison allows controller 29 to determine whether or not the rotary torque sensor is defective.

In a case where the defectiveness caused by the attachment of the iron powder or the like generates an error in the rotary torque sensing signal supplied from magnetic sensing element 28, controller 29 outputs, instead of the sensing signal having the error, the information of the rotary torque calculated from the rotary angle sensing signal to the electronic circuit. This mechanism allows controlling the power steering device with this rotary torque although it has somewhat lower accuracy.

Here is another way to deal with the foregoing defectiveness, i.e. the output of the rotary-torque information from controller 29 to the electronic circuit can be halted. In response to this halt, the electronic circuit makes the power steering device ineffective, or turns on a warning lamp, thereby informing the driver of the defectiveness.

Figure 4:
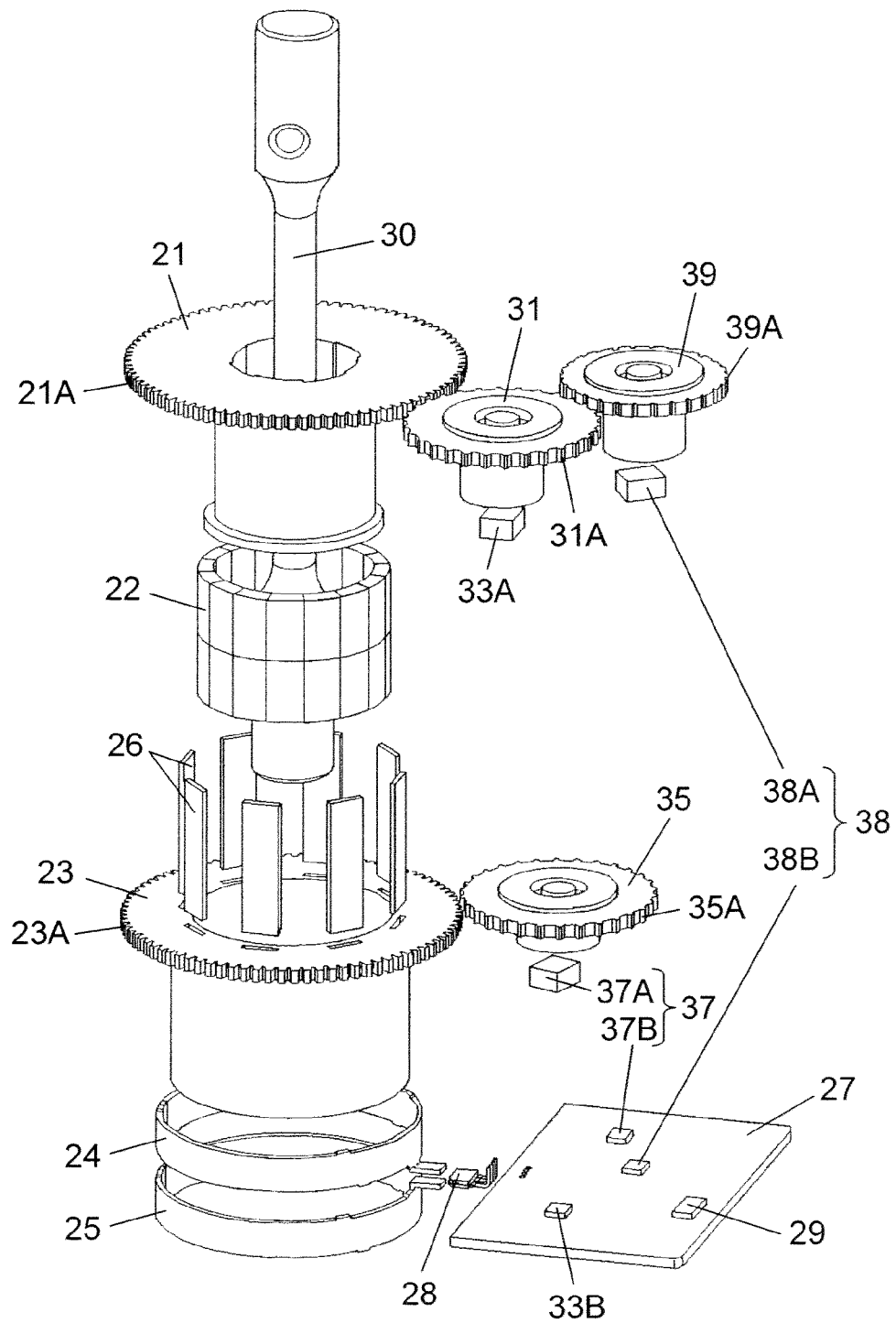
FIG. 4 is an exploded perspective view of another rotary angle and rotary torque sensing device in accordance with an embodiment of the present invention.
Figure 5:
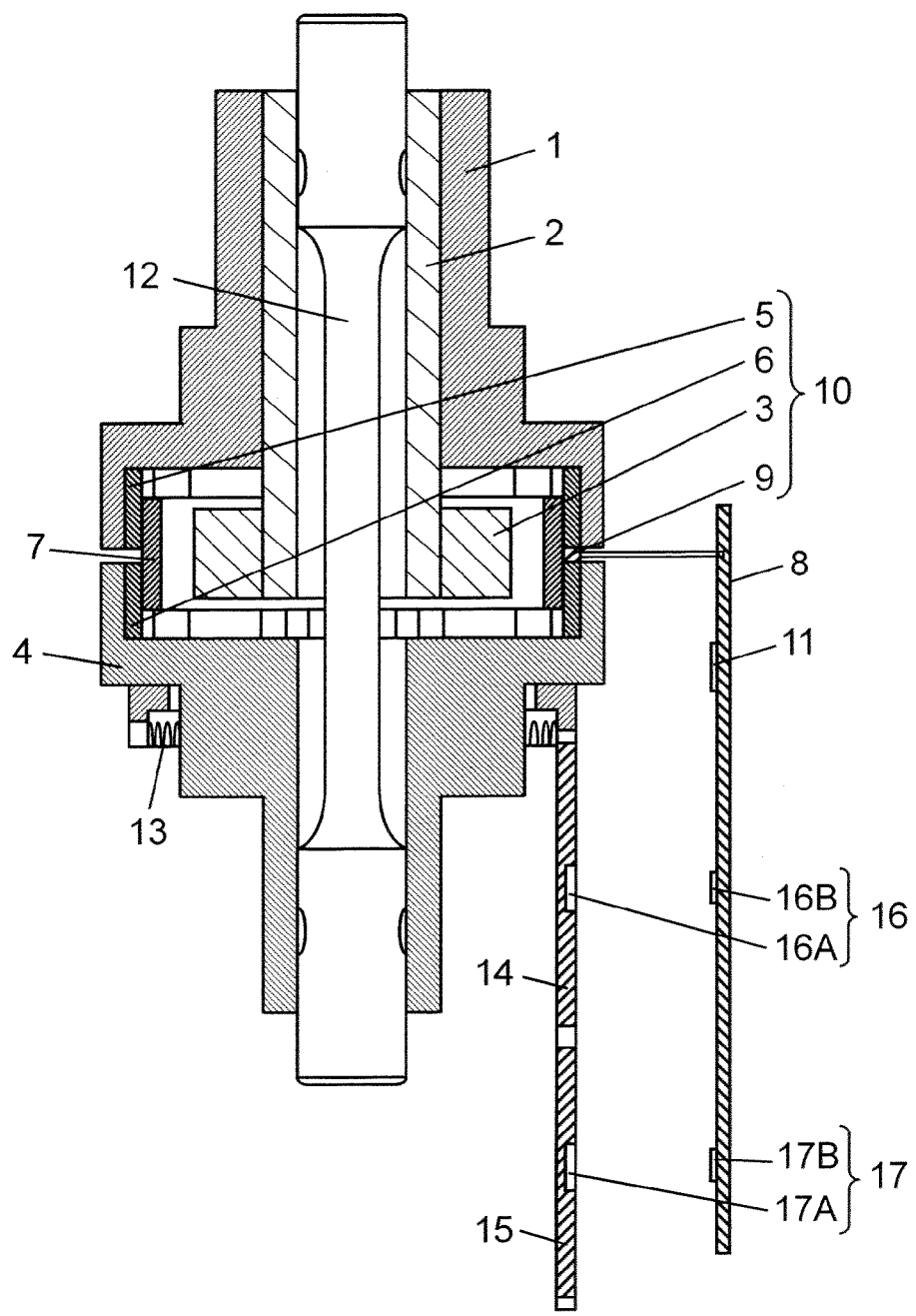
FIG. 5 is a sectional view of a conventional rotary angle and rotary torque sensing device.

In the previous descriptions, first rotator 21 and second rotator 23 are mated with first sensor 31 and second sensor 32 respectively, and those sensors 31, 32 have different diameters and different number of teeth from each other. The present invention, however, is not limited to this structure. For instance, FIG. 4 is an exploded perspective view illustrating another example of the rotary angle and rotary torque sensing device of the present invention. Rotary angle and rotary torque sensing device 41 includes second rotator 23 mated with second sensor 35 having the same diameter as that of first sensor 31. Spur gear 35A mounted to second sensor 35 has the same number of teeth, e.g. 30 teeth, as that of spur gear 31A. If necessary, third sensor 39 can mate with first sensor 31 which mates with first rotator 21, where sensor 39 has different diameter from that of sensor 31. In FIG. 4 spur gear 39A of third sensor 39 has a smaller number of teeth than that of spur gear 31A of first sensor 31.

Spur gear 39A mounted on the outer wall of third sensor 39 mates with spur gear 31A of first sensor 31. Spur gear 35A mounted on the outer wall of second sensor 35 mates with spur gear 23A of second rotator 23. Magnets 38A, 37A are mounted to the centers of third sensor 39 and second sensor 35 respectively. Variations in magnetisms of magnets 38A and 37A can be sensed by magnetic sensing elements 38B and 37B mounted on printed circuit board 27, whereby rotary-angle sensing signals are supplied to controller 29. Magnet 38A and magnetic sensing element 38B form rotary angle sensor 38, and magnet 37A and magnetic sensing element 37B form rotary angle sensor 37.

In the foregoing structure, controller 29 detects the rotary torque not only based on an accurate rotary-torque sensing signal supplied from the rotary torque sensor formed of magnet 22 and magnetic sensing element 28, but also based on the rotary-angle sensing signal supplied from first sensor 31 and second sensor 35, where second sensor 35 has the same number of teeth as first sensor 31 and starts rotating after a slight delay from first sensor 31. Comparing to the embodiment shown in FIG. 1, this mechanism can save controller 29 from calculating the number of teeth not only of first and second rotators 21, 23 but also of first and second sensors 31, 35, and can detect the rotary torque with ease only by taking the rotation delay of second sensor 35 relative to the first sensor 31 into account.

As discussed above, rotary angle and rotary torque sensing device 40 or 41 of the present invention includes the rotary angle sensor formed of magnets 33A, 34A, or 37A and magnetic sensing elements 33B, 34B or 37B, where these magnets and magnetic sensing elements sense the rotary angles of first sensor 31 and second sensor 32 or 35. By using not only the rotary torque sensor but also the rotary angle sensor, controller 29 detects the rotary torque. This structure allows the rotary angle sensor to sense the rotary torque even if foreign matter such as iron powder attaches to, e.g. magnet 22 of the rotary torque sensor. On top of that, controller 29 can determine whether or not the rotary torque sensor is defective by comparing the rotary torque detected from the rotary angle sensor with the rotary torque detected from the rotary torque sensor. When the defectiveness of the rotary torque sensor is detected, controller 29 outputs the rotary torque detected from the rotary angle sensor to the control circuit of the automobile. As a result, the rotary angle and rotary torque sensing device is obtainable for sensing rotary torque accurately and positively with a smaller error.

In the previous descriptions, the spur gears are formed on the outer walls of first rotator 21, second rotator 23, first sensor 31, and second sensor 32 respectively, and they mate with each other for rotating together; however, the present invention is not limited to this structure. For instance, bevel gears or other types of gears can replace the spur gears, or material having peaks and valleys thereon or material having great friction can be formed, instead of the gears, on the outer walls of the foregoing rotators and sensors, whereby they can rotate together.

In the previous description, controller 29 is mounted together with magnetic sensing elements 28, 33B, 34B on printed circuit board 27; however, the present invention is not limited to this structure. For instance, controller 29 can be incorporated in the electronic circuit of the automobile, and magnetic sensing elements 28, 33B, 34B are connected to this controller 29, thereby detecting the rotary angle and rotary torque of the steering shaft.

What is claimed is:

1. A rotary-angle and rotary-torque sensing device comprising:
    a first rotator rotating together with a steering shaft;
    a second rotator rigidly mounted to the first rotator via a coupler;
    a rotary torque sensor for sensing rotary torque generated between the first rotator and the second rotator;
    a first sensor rotating together with the first rotator;
    a second sensor rotating together with the second rotator;
    a rotary angle sensor for sensing rotary angles of the first sensor and the second sensor; and
    a controller coupled to the rotary torque sensor and the rotary angle sensor,
    wherein the rotary torque sensor further comprises:
        a first magnet disposed to the first rotator, shaped like a cylinder and formed of multiple poles arranged and magnetized such that different poles are placed adjoiningly to each other at intervals of a predetermined angle;
        a first ferromagnetic body shaped like a ring and disposed such that an inner wall of the first ferromagnetic body confronts the first magnet;
        a second ferromagnetic body shaped like a ring and disposed such that an inner wall of the second ferromagnetic body confronts the first magnet with a gap formed between the second ferromagnetic body and the first ferromagnetic body;
        a third ferromagnetic body disposed to the second rotator and placed between an outer wall of the first magnet and the inner walls of the first and second ferromagnetic bodies; and
        a first magnetic sensing element disposed in the gap formed between the first ferromagnetic body and the second ferromagnetic body, and
    wherein the controller detects rotary torque of the steering shaft by using the rotary torque sensor and the rotary angle sensor.

2. The rotary-angle and rotary-torque sensing device of claim 1, wherein the rotary angle sensor further comprises:
    a second magnet disposed at a center of the first sensor;
    a third magnet disposed at a center of the second sensor;
    a second magnetic sensing element disposed below the second magnet; and
    a third magnetic sensing element disposed below the third magnet.

3. The rotary-angle and rotary-torque sensing device of claim 2, wherein the controller detects rotary torque of the first rotator based on a shift quantity between a rotary angle of the second sensor and a rotary angle of the first sensor.

4. The rotary-angle and rotary-torque sensing device of claim 3, wherein the controller determines whether or not the rotary torque sensor is defective through comparing rotary torque sensed by the rotary torque sensor with rotary torque sensed by the rotary angle sensor.

5. The rotary-angle and rotary-torque sensing device of claim 4, wherein when the controller determines that the rotary torque sensor is defective, the controller outputs information of the rotary torque sensed by the rotary angle sensor.

6. The rotary-angle and rotary-torque sensing device of claim 4, wherein when the controller determines that the rotary torque sensor is defective, the controller halts an output of information of the rotary torque.

7. The rotary-angle and rotary-torque sensing device of claim 1, wherein the first sensor includes a first spur gear mating with the first rotator, and the second sensor includes a second spur gear mating with the second rotator, and wherein the first spur gear has a different number of teeth from that of the second spur gear.

8. The rotary-angle and rotary-torque sensing device of claim 1, wherein the first sensor includes a first spur gear mating with the first rotator, and the second sensor includes a second spur gear mating with the second rotator, and wherein the first spur gear has an equal number of teeth to that of the second spur gear.

* * * * *